Jan. 14, 1969  W. C. GREGORY  3,421,200
METHOD OF FORMING METAL ARTICLES
Filed Aug. 19, 1965

INVENTOR.
William C. Gregory

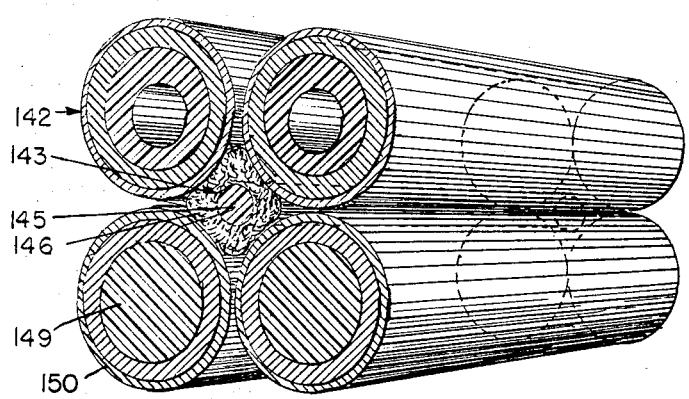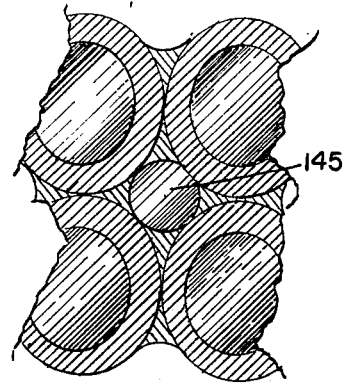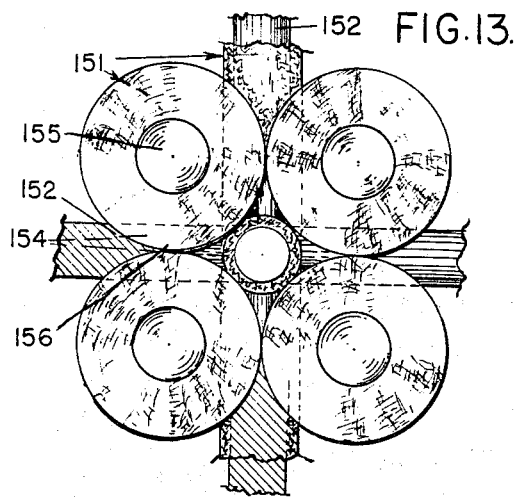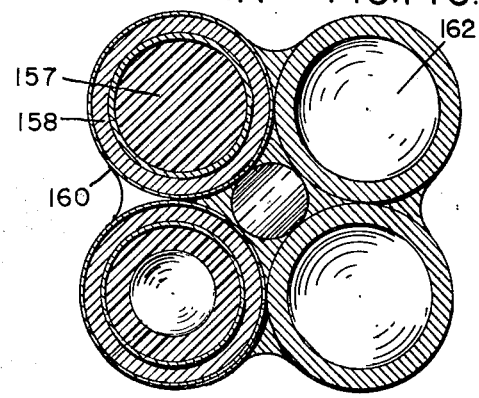

United States Patent Office 3,421,200
Patented Jan. 14, 1969

3,421,200
METHOD OF FORMING METAL ARTICLES
William C. Gregory, 520 N. Burris Ave.,
Compton, Calif. 90223
Continuation-in-part of application Ser. No. 213,431,
July 30, 1962. This application Aug. 19, 1965, Ser.
No. 480,939
U.S. Cl. 29—458    3 Claims
Int. Cl. B23p 3/12; B23p 25/00; E04b 1/06

ABSTRACT OF THE DISCLOSURE

The method of preparing structures having seed cores of self-combustible mixture, heating said structures in a furnace whereby the structures are united one to the other and the cores are oxidized to create an internal pressure different from the pressure at sea level.

This application is a continuation-in-part of U.S. patent application Ser. No. 213,431, filed July 30, 1962, now abandoned.

SUMMARY OF THE INVENTION

This invention relates to the fabrication of metal articles using oxidizable material within the article to be fabricated to furnish the heat necessary for the binding together of assembled articles.

An object of this invention is to provide a method of making pressurized structures or spheres using oxidizable material contained within the structure.

Another object of this invention is to provide material which will react within the spherical cavity of the structure so as to form a vacuum within the structure and simultaneously furnish at least part of the heat energy necessary to bond the structure together.

Another object of this invention is to bind articles together so that at least part of the fabricated article will be at atmospheric pressure, by oxidizing the oxidizable material within the articles to form a single structure.

Another object of this invention is to provide a heat decomposable mold having an oxidizable core.

The cores used in the structure may be of conventional materials such as cellulose nitrate, black gunpowder, and the like; however, cellulose nitrate is preferred.

A mold to maintain the core is preferably made with fibers that burn slowly and with difficulty, e.g., wool fibers or asbestos fibers. These fibers, woven into textile or formed into a mixture of fibers, are placed around the core in a predetermined manner to form a mold. This mold will act on the timed reaction principle. This novel mold allows the wool or other retarding supporting member to oxidize slowly enough so that the molten binding material will freeze (become solid) before this supporting material is decomposed. The ports and newly formed passageways formed by this assembly process allow all of the oxidizable fibers and the freed asbestos fiber to be easily removed from the finished structure.

The core for the preferred spheres can be made by a large number of well-known commercial methods, for example:

(1) Breaking up a mass of material that is in the plastic and/or fluid state with a stream of air or steam, and then allowing the particles to fall slowly through a temperature controlled fluid.

(2) Spraying a mass of material that is dispersed in a volatile solvent as the top of a tower, allowing the volatile solvent to escape as the hardening dispersed material slowly falls through a fluid.

(3) Spheres can be formed by dividing the material, whether a plastic or a metal and then allowing the divided material a free fall in a fluid until the divided material takes on a spheroidal form and has solidified.

(4) Hollow spheres, or sphere balloons, having a varying wall thickness can be blown by any of the conventional methods.

DESCRIPTION OF THE DRAWING

FIGURE 11 illustrates a method of producing cylindrical structures using a preferential oxidizing core;

FIGURE 12 illustrates the structures of FIGURE 11 after heat-treating.

FIGURE 13 discloses how spheres can be made into a cubic unit structure by using a preferential oxidizable mold made from a readily oxidizable core that is encased with a material that oxidizes relatively slowly; and FIGURES 14A, B, C and D illustrate structures of FIGURE 13 after the oxidizable material has been burned off and the metal parts bonded into a single structure.

DESCRIPTION OF THE PREFERRED EMBODIMENTS

Figure 1:
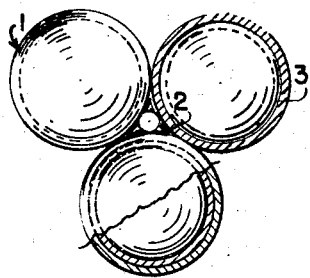
FIGURE 1 illustrates a complete article made from individual, hollow, gas-filled, cored spheres.

FIGURE 1 illustrates the method of making non-conducting pellets 1 not only conductive, but also binding the pellets into articles 2 by chemical plating the various parts simultaneously. This plating 3 is accomplished by impregnating or coating the pellet 1 with a solution preferably containing a soluble metal salt, e.g., copper, and then a reducing agent which will deposit the metallic form. The prepared pellets 1 are then placed in a mold 11, having a predetermined form or design and provided with circulating ducts through which the chemical plating solution can flow around the pellets 1 until the deposit becomes so thickly plated that the holes or interstices become practically closed. The circulating chemical plating solution is made by diluting a solution of Enthone's metal salt, a reducing agent, and a solution of a buffer or complexing agent with water in the ratio of 1:1:1. The plating temperature should be kept at 65 to 75 degrees F. In this embodiment the pellet 1 is shown as a hollow plastic sphere.

Figure 2:
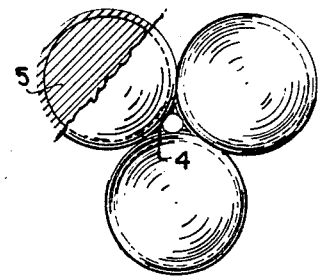
FIGURE 2 illustrates a complete article made from solid, cored pellets or seeds.

In FIGURE 2 a modified article of commerce 4 is shown using spherical solid pellets 5 made from material that may or may not be decomposable by heating to form a pressurized, gas-filled pellet or a vacuum void pellet. In this embodiment the pellets 5 are coated and formed into an article of commerce substantially as in FIGURE 1.

Figures 3, 4:
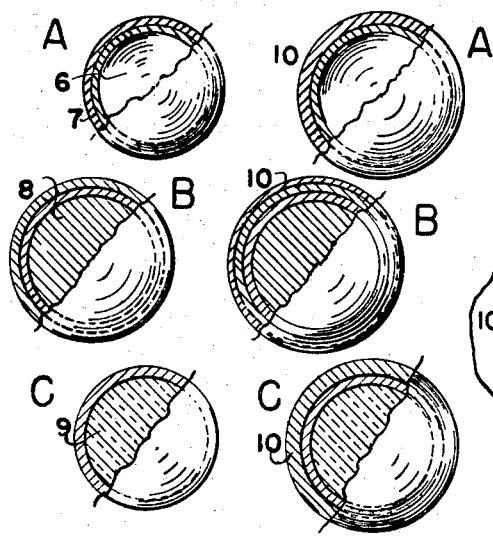
FIGURE 3A illustrates a hollow, cored sphere having an outer conducting layer.
FIGURE 3B discloses a solid, non-oxidizable, cored pellet having an outer conducting shell.
FIGURE 3C illustrates a sphere having a core of oxidizable material and an outer conducting surface.
FIGURES 4A, 4B and 4C disclosed spheres similar to FIGURES 3A, 3B and 3C, but coated with a metal shell to bear a designed load.

FIGURE 3 illustrates three separate spheres with pellets 6, 8 and 9 that could be used, such as gas-filled 6, and made from plastic and/or other organic matter 7, pellets 8 that are solid and do not decompose when heated. Such pellets could be made from metal such as iron, e.g., non-metal such as glass beads, or organic materials such as phenolic resins, etc. The pellets 9 of FIGURE 3C decompose upon heating to change from the solid state to the gaseous state, thereby creating a gas pressure within the pellet 9. Such pellets could be made from cellulose nitrate, a modified black gunpowder, and the like. The pellets of FIGURES 4A, B and C have a thick layer of metal 10 electrolytically applied so as to withstand the forces it is designed to carry. The electrolytically deposited metal 10 may have only one element present, or it may be an alloy, the different metals being co-deposited.

Figure 5:
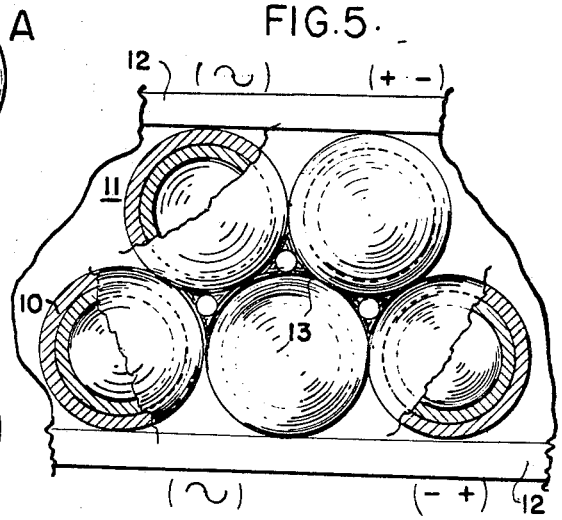
FIGURE 5 presents a method of making articles by spot welding the prepared spheres.

The mold 11 (see FIGURE 5) has a predetermined form, and one that is provided with electrodes 12. The prepared pellets of FIGURE 4 are poured into the mold 11, and the mold 11 vibrated so as to settle the pellets and thus fill up the voids that may otherwise occur. A suitable electric current is then passed through the pellets from the electrodes 12, forming a spot weld 13 at each point of contact. When gas pellets, shown in FIGURE 4C, are used, the pellets are decomposed at the moment of welding.

Figures 6, 7:
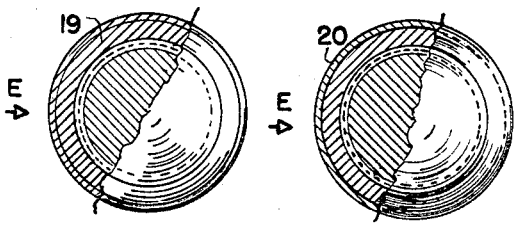
FIGURE 6 discloses how non-conductive balls are made conductive by spraying the said balls with atomized metal.
FIGURE 7 shows schematically the steps necessary in making prepared spheres.

FIGURE 6 schematically illustrates another method of making non-conducting pellets 14 conductive by spraying the pellets with an atomized, thermally-heated metal spray 16. Other methods could be used to make non-conductive materials conductive, for example, coating a pellet with a waterproof adhesive, and while still sticky, covering the pellet with a precipitated, finely divided metal powder, or a finely divided conducting graphite.

FIGURE 7 represents the steps for preparing articles of commerce made from gas-pressurized pellets 17, utilizing an electrolytic revolving barrel plating bath E. The heat-decomposable, non-conducting pellet (preferably spherical) 17, is made conductive by coating the surface with a conducting material 18. The pellet 17, now conductive, is placed in an electrolytic plating bath and the additional metal 19 that is to carry the physical load of the finished article, is plated onto the conducting coating 18. The additional metal 19 may be a single element or an alloy, the various metals being codeposited. The pellet 17 is now removed from the first bath rinsed, and while still wet, another metal coating 20 is applied to the pellet. The object of this deposit is to furnish a metal capable of binding the pellets together into a single solid structure when heat-treated. The thickness of this deposit 20 should be as light as possible and still give the required bonding strength. When the load is light a tin or tin-lead solder might suffice; if the load is fairly heavy, the pellets may be coated with a brazing bronze, e.g., a copper-tin alloy, or a silver solder, e.g., a silver-copper alloy; and when the load is heavy, an alloy of iron may be deposited. This ferrous alloy should have a lower melting point than the structural metal deposited on the structural shell.

Figure 8:
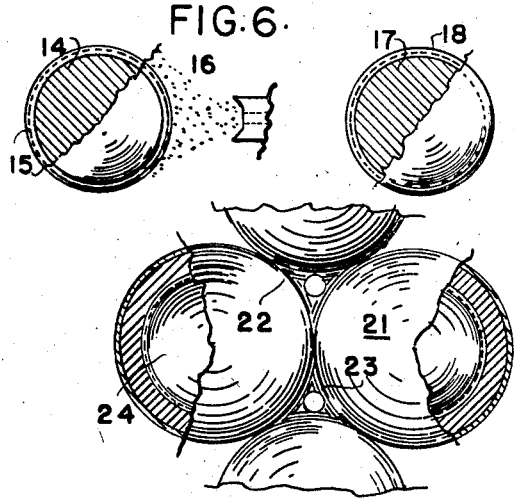
FIGURE 8 discloses a finished article.

FIGURE 8 shows the finished articles of commerce 21. The binding metal 20 has melted and has joined the pellets together at the point of contact 22, and has partially filled the interstices 23. The heat of fusion has caused the solid pellets 17 to decompose, thus filling the cavities thus formed with a gas under great pressure 24, or the solid pellet 17 may have reacted so as to make a vacuum 24 within the cavity of the pellet 17.

Figure 9:
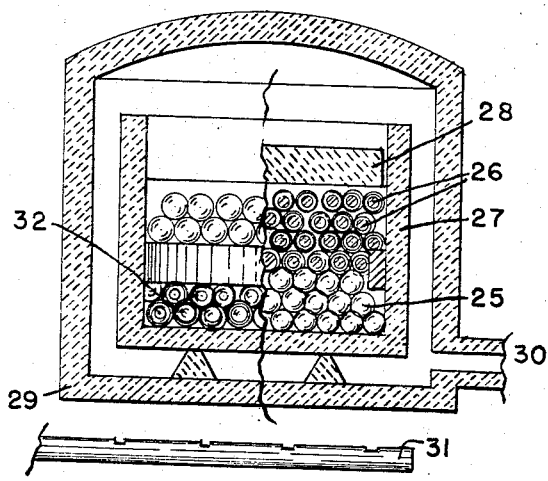
FIGURE 9 illustrates a method of making articles with prepared spheres, using a vacuum furnace and heated with a conventional carbonaceous fuel fired furnace.

In the representation of FIGURE 9, the prepared pellets 25 have a solid heat-decomposable core 26, and are poured into a mold 27, and a weighed movable cover 28 is placed on the pellets 25. The atmosphere within a muffle furnace 29, into which the mold 27 is placed, is displaced by introducing an inert gas, or a reducing atmosphere within the muffle furnace 29 through an inlet 30. Preferably, the furnace 29 is fired with carbonaceous fuel by means of a suitable burner 31. The solid core 26 of each of the pellets 25 may be of such a material that when decomposed, this solid material will form a gas, thus causing a great pressure within the cavity of each pellet 25, and simultaneously liberating a large amount of heat energy, or it may react to cause a vacuum within each pellet cavity that is formed, depending upon the substance of the core 26. Powdered magnesium could be used to form a vacuum in the cavity of the pellets 25, for upon heat-treating it readily oxidizes to an oxide, nitride, or other non-volatile solid. At heat-treating temperature a solidified structure 32 is formed by fusing together at their points of contact of the pellets 25.

Figure 10:
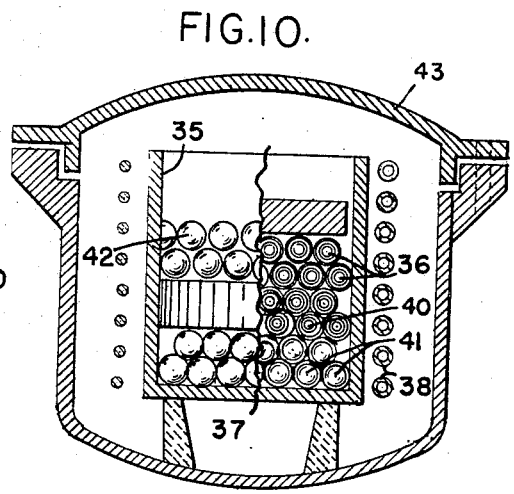
FIGURE 10 presents a method of making articles in a pressurized furnace heated by electric energy.

FIGURE 10 shows schematically a method of producing an article in a pressurized mold 35. The object of using pressure is to balance the pressure within the pellet 36 and the atmospheric pressure. The pressure within the pellet 36 is greatest at the moment of reaching the heat-treating temperature and the tensile strength of the structural metal is at its lowest value. The mold 35 is filled with the prepared pellets 36 placed on insulating supports 37. Means 38 for heating electrically are then placed around the mold 35. The heating, for example, can be accomplished by using high frequency current or by resistant heating. The illustration of FIGURE 10 shows the unfired gas filled pellets 36, while 40 shows the material of the walls of the pellet 36 decomposed to a gas, and at the same time the pellets 36 are fused at the point of contact 41. The finished product is illustrated as 42. The heat-treating takes place in a pressure vessel 43, into which a fluid is pumped. This fluid, not illustrated, may be an inert gas or a liquid. The pressure of the fluid within the pressure vessel 43, before heating, should be about the same as the pressure that will be developed within the cavity of the pellet 36 at the time of heat-treating. This pressure can be determined only by experimentation.

The modifications of FIGURE 11 illustrate a method of producing cylindrical structures 142, using a preferential oxidizing core 145. The cylindrical structures 142 can be bound together, using a mold 143, which is capable of oxidizing at different rates. The core 145 of the mold 143 may be made of cellulose nitrates, while the outer portion 146 is made of a mixture of slowly oxidizable material and asbestos fiber. This mixture surrounds the core 145, and may be made into any desirable shape. The cylindrical structures 142 are formed around a support core 149, and may have a binding material 150 that melts at a low temperature.

The upper cores 142 in FIGURE 11 are illustrated as hollow, while the lower cores 142 are solid. In other words, the composition of the core 149 may vary and still achieve the desired end article.

FIGURE 12 shows the cylinder structures 142 after heat-treating, and bound together to form a single structure. It will be noted that another duct may be formed where the core material 145 was before it was oxidized.

FIGURE 13 shows a modification of a cubic unit structure which can be made with spheres 155. A mold 151 is made with a core material 152 of a mixture of wool fiber 154 or other slow-burning material such as asbestos fiber which surrounds the spheres 151. The sphere core material 152 is shown touching at right angles at points 156.

The finished article in FIGURES 14A, B, C and D is now in position for heat treating and shows the cores 157 of FIGURES 14A and B as being solid, while the cores 162 of FIGURES 14C and D are hollow, either being a vacuum or pressurized. A conductive coating material 158 has been applied to the cores as previously described. Over the coating 158 is applied the structural metal layer 160 which will fuse the cores together as illustrated when heat-treated.

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims so as to embrace any and all equivalent devices.

I claim:
1. A method of preparing a structural metallic article including the steps of:
    preparing a core of a self-combustible mixture, which upon combustion will give a predetermined amount of gaseous reaction;
    coating the core with at least one structural metal, creating a support adapted to form a unit of said structural metallic article;
    coating the support unit with at least one bonding material;
    confining a plurality of support units coated with said bonding material by a mold of a desired shape;
    placing the mold in a furnace wherein the assembled support units are heated to at least the ignition temperature of said cores, which when ignited provide sufficient internal heat to sinter the structural metal and melt the said bonding material, fusing said support units together while creating the desired atmospheric pressure within each support unit.

2. A method of preparing a structural metallic article as recited in claim 1, wherein the structural metal coating is applied by spraying the coating on said core.

3. A method of preparing a structural metallic article as recited in claim 1, wherein the cores are spherical in shape.

References Cited

UNITED STATES PATENTS

| | | | |
|---|---|---|---|
| 948,541 | 2/1910 | Coleman | 52—382 |
| 2,806,509 | 9/1957 | Bozzacco et al. | |
| 2,985,411 | 5/1961 | Madden. | |
| 3,031,046 | 4/1962 | Hoadley. | |
| 3,135,044 | 6/1964 | Mote et al. | 29—423 |

JOHN F. CAMPBELL, *Primary Examiner.*

PAUL M. COHEN, *Assistant Examiner.*

U.S. Cl. X.R.

29—455, 498, 501, 502, 503, 527; 89—36; 82—382